United States Patent [19]

Ishizuka et al.

[11] Patent Number: 4,776,654

[45] Date of Patent: Oct. 11, 1988

[54] SCANNING OPTICAL SYSTEM

[75] Inventors: Tazuko Ishizuka; Akira Morimoto; Yuji Matui, all of Tokyo, Japan

[73] Assignee: Asahi Kogaku Kogyo Kabushiki Kaisha, Tokyo, Japan

[21] Appl. No.: 35,573

[22] Filed: Apr. 7, 1987

[30] Foreign Application Priority Data

Apr. 7, 1986 [JP] Japan .................................. 61-79538

[51] Int. Cl.⁴ .............................................. G02B 26/08
[52] U.S. Cl. ..................................... 350/6.8; 350/6.7; 350/6.5
[58] Field of Search ................ 350/358, 6.8, 6.6, 6.1, 350/6.5, 6.7; 358/201

[56] References Cited

U.S. PATENT DOCUMENTS 4,180,822  12/1979  Hudson et al. ..................... 350/6.8

FOREIGN PATENT DOCUMENTS 0007197  1/1980  European Pat. Off. ............ 350/6.8
0222812  12/1984  Japan ................................. 350/6.8

Primary Examiner—Eugene R. Laroche
Assistant Examiner—Nathan W. McCutcheon
Attorney, Agent, or Firm—Sughrue, Mion, Zinn, Macpeak, and Seas

[57] ABSTRACT

A scanning optical device including a rotating polygonal mirror or oscillating mirror. Two acoustooptical devices are disposed along the path between the light source and the mirror and are set for respective time-constant angles of deflection to compensate for tilting of the mirror without introducing an offset.

4 Claims, 1 Drawing Sheet $F_1 = K(\theta_{M1} + S(t))$  $F_2 = K\theta_{M2}$

SCANNING OPTICAL SYSTEM

BACKGROUND OF THE INVENTION

1. Field of the Invention

The present invention relates to an optical scanning apparatus having a capability of correcting the tilting of any reflecting surface of a rotating polygonal mirror (or an oscillating mirror) using an acoustooptical device. More particularly, the present invention relates to a scanning apparatus provided with an arrangement for correcting any offset introduced into the position where incident light falls upon any of the reflecting surfaces of the rotating polygonal mirror (or oscillating mirror).

2. Background of the Invention

If a scanning optical system employing a rotating polygonal mirror or an oscillating mirror (these two types of mirror are hereinafter collectively referred to simply as a rotating polygonal mirror) experiences tilting of any of the reflecting surfaces of the rotating polygonal mirror, the resulting image will be offset in its position in a sub-scanning direction (i.e., direction perpendicular to the main scanning direction). A variety of methods have been proposed for correcting this positional offset and examples of the "tilting face correcting method" that employ an acoustooptical device are found in Unexamined Published Japanese Patent Application Nos. 145007/1975 and 84440/1982.

The methods proposed in these patents make use of the fact that the angle of diffraction, $2\theta$, of light incident upon an acoustooptical device is proportional to the frequency f of the ultrasonic wave applied to the device as expressed by:

$$2\theta = f\lambda/v$$

where $\lambda$ is the wavelength of light, and v is the velocity of sound propagating in a modulating medium.

If the methods mentioned above, the acoustooptical device is positioned ahead of the rotating polygonal mirror so that incident light will pass through the acoustooptical device before it encounters any of the reflecting surfaces of the polygonal mirror. The amount of tilting of a polygon face is at a first stage determined either by direct measurement or by detecting with suitable instrumentation such as light-receiving device with the light being swept over the scanning face on a real-time basis. By supplying the acoustooptical device with a signal having a frequency proportional to the determined amount of tilting, the angle of light incident upon the rotating polygonal mirror is controlled in accordance with the tilting of a reflecting face.

Two layouts are conventionally used in the scanning optical system that achieves correction of a tilting polygon face with an acoustooptical device and they are shown in FIGS. 1 and 2. The optical system shown in each of these figures includes the essential components up to the rotating polygonal mirror and does not include the component at later stages, such as a condensing optical system (e.g. f·$\theta$ lens) and the scanning face.

In FIG. 1, a light source 1 emits parallel rays of light 2 that are condensed by a first lens system $L_1$. An acoustooptical modulator 3 is located at the position where the parallel rays of light are condensed by the first lens system $L_1$. The light 2 incident upon the acoustooptical modulator 3 is light-modulated in accordance with electrical image information (i.e., an optical two-state (ON-OFF) signal is produced). The modulated light is processed into parallel rays by a second lens system $L_2$, which are then fed to an acoustooptical deflector 4.

The deflector 4 deflects the incident parallel rays of light 2 by an angle corresponding to the amount of tilting of a face of a rotating polygonal mirror 5. The parallel beam issuing from the deflector 4 is enlarged to a predetermined spot diameter by a third lens system composed of lens units $L_3$ and $L_4$ and encounters a reflecting surface of the polygonal mirror 5 at a predetermined angle.

In this arrangement, the position of light falling upon the polygonal mirror 5 differs between the case where the light is deflected by the deflector 4 or the case where it is not deflected and the amount of positional offset S is expressed by:

$$S \simeq M\, l_2\, \theta_D$$

where M is the magnification by which the beam is enlarged by the two lens units $L_3$ and $L_4$, $l_2$ is the distance from the deflector 4 to the first unit $L_3$ of the third lens system, and $\theta_D$ is the angle of sweep by the deflector 4. The angle of light $l_P$ incident upon the polygonal mirror 5 is expressed by $\theta_D/M$.

The system shown in FIG. 2 uses a single acoustooptical device that performs the functions of both the modulator and the deflector shown in FIG. 1. As in the case shown in FIG. 1, parallel rays of light 2 issuing from a light source 1 are condensed by a first lens system $L_1$ However, an acoustooptical device 3 that serves both as a modulator and as a deflector is disposed either ahead of or behind the position where the light emerging from the first lens system $L_1$ is condensed. The distance between this position and the device 3 is indicated by $l_3$. Therefore, the beam as its passes through the acoustooptical device 3 is subjected both to light modulation in accordance with electrical image information and to deflection by an amount that corresponds to the tilting of a face of the rotating polygonal mirror 5.

As also shown in more detail in FIG. 3 the so processed beam passes through a second lens system $L_2$ and the resulting parallel beam is enlarged in spot diameter by a third lens system composed of lens units $L_3$ and $L_4$ and falls upon a reflecting surface of the polygonal mirror 5 at a predetermined angle. Again, however, the position of light flux falling upon the polygonal mirror 5 in the system of FIG. 3 differs between the case where the light is deflected or the case where it is not and the amount of positional offset S is expressed by:

$$S \simeq (l_3 + f_4) M\, \theta_M$$

where $f_2$ is the focal length of the second lens system $L_2$, $\theta_M$ is the angle of sweep by the acoustooptical device 3, and M is the magnification as defined above. FIG. 3 is an exaggerated sketch of the offset S and the nonparallelness introduced by correction. The angle of light $\theta_P$ incident upon the polygonal mirror 5 is expressed by:

$$\theta_P \simeq l_3/f_2 \cdot \theta_M/M$$

where $l_3$ has a positive value if the acoustooptical device 3 is disposed ahead of the first lens system $L_1$ and has a negative value if it is disposed behind the first lens system $L_1$.

As described above, if the angle of light incident upon the rotating polygonal mirror is controlled by an acoustooptical device in the conventional tilting face correcting systems, an offset in the position at which light encounters the polygonal mirror also occurs, causing the following problems. First, the rotating polygonal mirror has to be fabricated in such a way as to allow for the potential offset and the resulting increase in the width of the polygonal mirror unavoidably leads to increased difficulty in manufacture and a higher cost. Secondly, if the light that has experienced such positional offset is reflected by the polygonal mirror to fall upon a condensing optical system such as a f·θ lens, not only aberrational changes such as curvature of field but also an unwanted image shift in the sub-scanning direction occurs, causing deterioration of the image formed on the scanning surface.

The offset of incident position could be decreased by reducing the magnification M of the deflected light. However, the upper limit of the spot diameter of light that can be introduced into the acoustooptical device is determined by mechanical factors and there is no room for adjusting the magnification M if one wants to have a beam of a predetermined spot diameter fall upon the rotating polygonal mirror. If a beam with a small spot diameter encounters the polygonal mirror, the magnification M is small enough to produce a less pronounced offset in the position of incident flux. However, if there is a need to increase the spot diameter of incident light, the magnification M increases to such a level that the amount of offset in incident position is no longer negligible.

As a further problem, if M is made small compared with $\theta_M$ or ($\theta_D$) which is the angle of sweep by the acoustooptical device, the angle incident $\theta_P$ of light falling upon the polygonal mirror is increased to render it difficult to achieve very fine correction of tilting faces.

SUMMARY OF THE INVENTION

The present invention has been accomplished in order to solve the aforementioned problems. Thereof an object of the invention is to provide a scanning optical system by which both the offset in the position of light flux incident upon a rotating polygonal mirror and the incident angle of that light can be corrected simultaneously.

This object is achieved by employing two acoustooptical devices for correcting the incident angle and the offset.

DETAILED DESCRIPTION OF THE PREFERRED EMBODIMENTS

Figure 1:
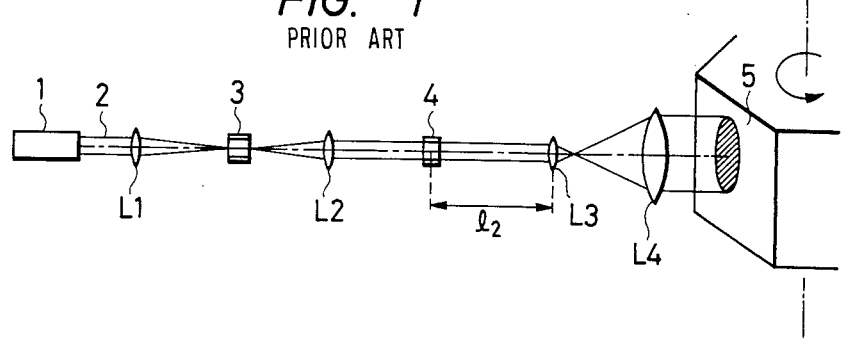
FIGS. 1 and 2 are schematic drawings showing the layouts of two conventional system.
Figure 2:
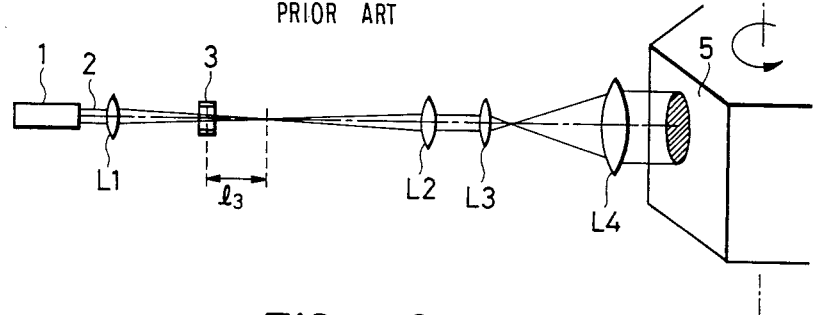
Figure 3:
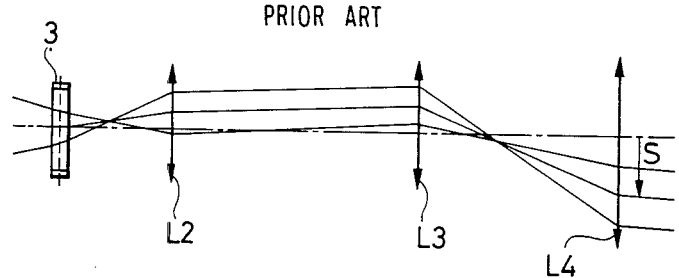
FIG. 3 is an exaggerated sketch of the offset introduced into the incident position of light as a result of deflection.
Figure 4:
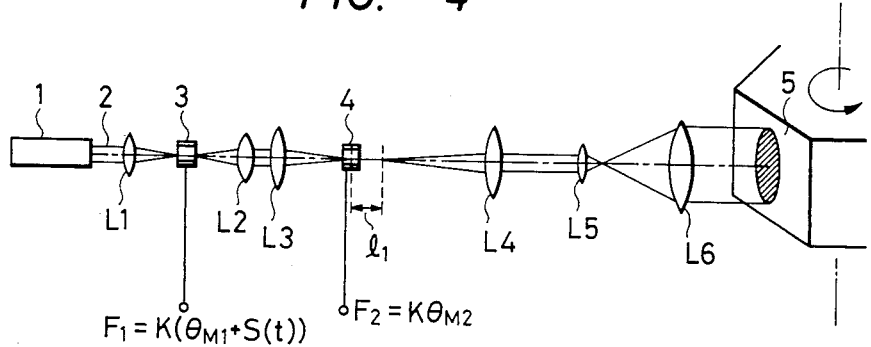
FIG. 4 is a schematic drawing showing the layout of an optical system according to one embodiment of the present invention.

An embodiment of the present invention is hereinafter described with reference to FIG. 4. A light source 1 emits parallel rays of light to be condensed by a first lens system $L_1$. A first acoustooptical device 3 is disposed at the position where the light is condensed by the first lens system $L_1$. Light fed into the first acoustooptical device 3 is optically modulated in accordance with electrical image information S(t) and is also deflected by an angle of $\theta_{M1}$ that corresponds to the amount of offset in an incident position which is predicted from the amount of tilting of a face of a rotating polygonal mirror 5. That is, the frequency F of the signal driving the first acoustooptical device 3 is $F_1 = K(\theta_{M1} + S(t))$, where K is a proportionality constant dictated by the device characteristics (See the first equation in the Background Section) and S(t) is the binary data signal.

The deflected light passes through a second lens system composed of lens $L_2$ and $L_3$ and encounters a second acoustooptical device 4 at a position that is spaced by a distance of $l_1$ from the position where the light is condensed. The second acoustooptical device 4 deflects the incident light by an angle of $\theta_{M2}$ that corresponds to the amount of tilting of a face of the polygonal mirror 5. The frequency $F_2$ of the signal driving the second acoustooptical device is given by $F_2 = K\theta_{M2}$.

Light from the second acoustooptical device 4 is passed through a third lens system $L_4$ and the resulting parallel beam is fed into a fourth lens system of lens unit $L_5$ and $L_6$ where it is enlarged by a magnification M to produce a predetermined spot diameter. The enlarged beam then subsequently falls on the polygonal mirror 5 at a predetermined angle.

In the embodiment described above, the incident angle $\theta_P$ of light falling upon the polygonal mirror 5 is expressed by:

$$\theta_P = \theta_{M2} l_1 / f_4 M \tag{1}$$

and the amount of offset in its incident position, S, is expressed by:

$$S = [-f_2 \cdot f_4 \cdot \theta_{M1}/f_3 + (l_1 + f_4) \cdot \theta_{M2}] \cdot M \tag{2}$$

where M is the magnification by which the spot diameter of light beam is enlarged by the fourth lens system $L_5$ and $L_6$; $l_1$ is the distance from the position at which light is condensed by the second lens system $L_2$ and $L_3$ to the second acoustooptical device 4. ($l_1$ being a positive value when the second acoustooptical device 4 is positioned ahead of the light condensing position and a negative value when it is behind this position); $f_2$ is the focal length of first lens unit $L_2$ of the second lens system; $f_3$ is the focal length of the second lens unit $L_3$ of the same; and $f_4$ is the focal length of the third lens system $L_4$.

According to the present invention, the deflection angle $\theta_{M2}$ of the second acoustooptical device 4 is first set to a value in consideration of the amount of tilting of a face of the polygonal mirror, then the focal lengths of the respective lens systems and the distance $l_1$ are determined such as to satisfy the condition set forth by the following equation (3).

$$\theta_{M1} = [f_3 \cdot (l_1 + f_4)/(f_2 \cdot f_4)] \cdot \theta_{M2} \tag{3}$$

If the first acoustooptical device 3 is designed to effect deflection at the angle $\theta_{M1}$ that is determined by the above procedures, the offset in the incident position of light falling upon the polygonal mirror can be substantially eliminated.

If we assume a case where $f_2 = 340$ mm, $f_3 = f_4 = 280$ mm, $M = 15$ and $l_1 = 30$ mm and if $\theta_P$, or the incident angle of light falling upon the polygonal mirror after it has been adjusted for the tilting of a face of the mirror, is 10.3'', Eq. (1) indicate that the angle of deflection by the second acoustooptical device 4 is $\theta_{M2}=0.40°$, and Eq. (3) shows that the angle of deflection by the first acoustooptical device 3 is $\theta_{M1}=0.36°$. If $\theta_{M1}$ is set to this value, the offset in the incident position of light falling upon the polygonal mirror can be substantially eliminated.

If we assume another case where $f_3=f_4=280$ mm, $f_2=310$ mm, $l_1=30$ mm and $M=15$ and if $\theta_P$ is set to 10.3'' as in the first case, Eqs. (1) and (3) indicate that $\theta_{M1}=\theta_{M2}=0.4$. In the other words, the angle of deflection by the first acoustooptical device 3 can be made equal to that of deflection by the second acoustooptical device 4 and yet the offset in the incident position of light falling upon the polygonal mirror can be effectively corrected. In this case, both acoustooptical devices can be electrically controlled with a sweep oscillator to realize simplified processing in an associated electrical circuit.

The above description concerns the most desirable embodiment of the present invention and various modifications may be used in practical applications. For instance, the lens system $L_2$ and $L_4$ by which the light passing through the first and second acoustooptical devices is collimated may be ommited. In addition, the first acoustooptical device 3 may be disposed slightly away from the position where light passing through the lens system $L_1$ is condensed and this arrangement has the advantage that not only the second acoustooptical device 4 but also the first acoustooptical device 3 participates in correcting the offset in incident position in accordance with the amount of tilting of a face of the polygonal mirror. When such modifications are made, the relationships expressed by Eqs. (1) to (3) are not fully satisfied unless some additional correction is effected. However, even in this case, the object of the present invention is attained if the angles of deflection by the first and second acoustooptical devices are determined in such a way as to allow for the tilting of a face of the rotating polygonal mirror 5 and the offset in incident position of light falling on that mirror.

In the embodiment described above, light modulation is achieved by the first acoustooptical device 3 but this is not an absolute requirement and an electrooptical (E/O) device may be disposed on the side of the first lens system $L_1$ which is close to the light source 1. In this case, the E/O device may be disposed on the side of the first lens system $L_1$ which is close to the light source 1.

As described above, the system of the present invention achieves simultaneous correction of the incident angle of light falling upon a rotating polygonal mirror, as well as of the offset in the incident position of that light. This prevents light from encountering a condensing optical system with no correction being made with respect to the offset that has been introduced into the incident position of light falling upon the polygonal mirror. This is also effective in eliminating the chance of deterioration of the image to be formed on the scanning surface. In addition, a deflected beam can be enlarged in spot diameter at a fairly large magnification without causing any substantial offset in the incident position of light falling upon the polygonal mirror and this leads to a greater latitude in system design.

What is claimed is:

1. A scanning optical system, comprising:
   reflecting means including either a rotating polygonal mirror or an oscillating mirror rotating or oscillating along a first direction;
   a light source;
   a first lens system for condensing light issuing from said light source;
   a first acoustooptical device which is disposed at, or near, the position where light is condensed by said first lens system;
   a second lens system which condenses the light that has passed through said first acoustooptical device;
   a second acoustooptical device which is disposed at a position that is spaced by a predetermined distance from the position where light is condensed by said second lens system; and
   a third lens system which allows the light that has passed through said second acoustooptical device to fall upon a reflecting surface of said reflecting means;
   wherein non-zero constant angles of deflection in a second direction perpendicular to said first direction achieved by said second and first acoustooptical devices are determined according to an amount of tilting of a face of said reflecting surface of said reflecting means and for an offset in incident position of light falling upon said reflecting surface respectively.

2. A scanning optical system according to claim 1 wherein said constant angle of deflection of said first acoustooptical device is made equal to said constant angle of deflection of said second acoustooptical device.

3. A scanning optical system as recited in claim 1, wherein said second lens system comprises two lens units having respective focal lengths $f_2$ and $f_3$, said third lens system has a focal length $f_4$, said predetermined distance is $l$ and said constant angles of deflection of said first and second acoustooptical device are respectively $\theta_{M1}$ and $l_{M2}$ and are substantially related as $$\theta_{M1}=[f_3\cdot(l+f_4)/(f_2f_4)]\cdot\theta_{M2}.$$

4. A scanning optical system as recited in claim 1, wherein a signal having a variable frequency is applied to said first acoustooptical device, said variable frequency being a sum of a constant frequency providing said non-zero constant angle of deflection for said first acoustooptical device, and a binary-valued modulation frequency.

* * * * *